Aug. 9, 1932.   J. T. SHIMMIN   1,870,387
MULTIPLEX FILTER
Filed Dec. 27, 1930   2 Sheets-Sheet 1
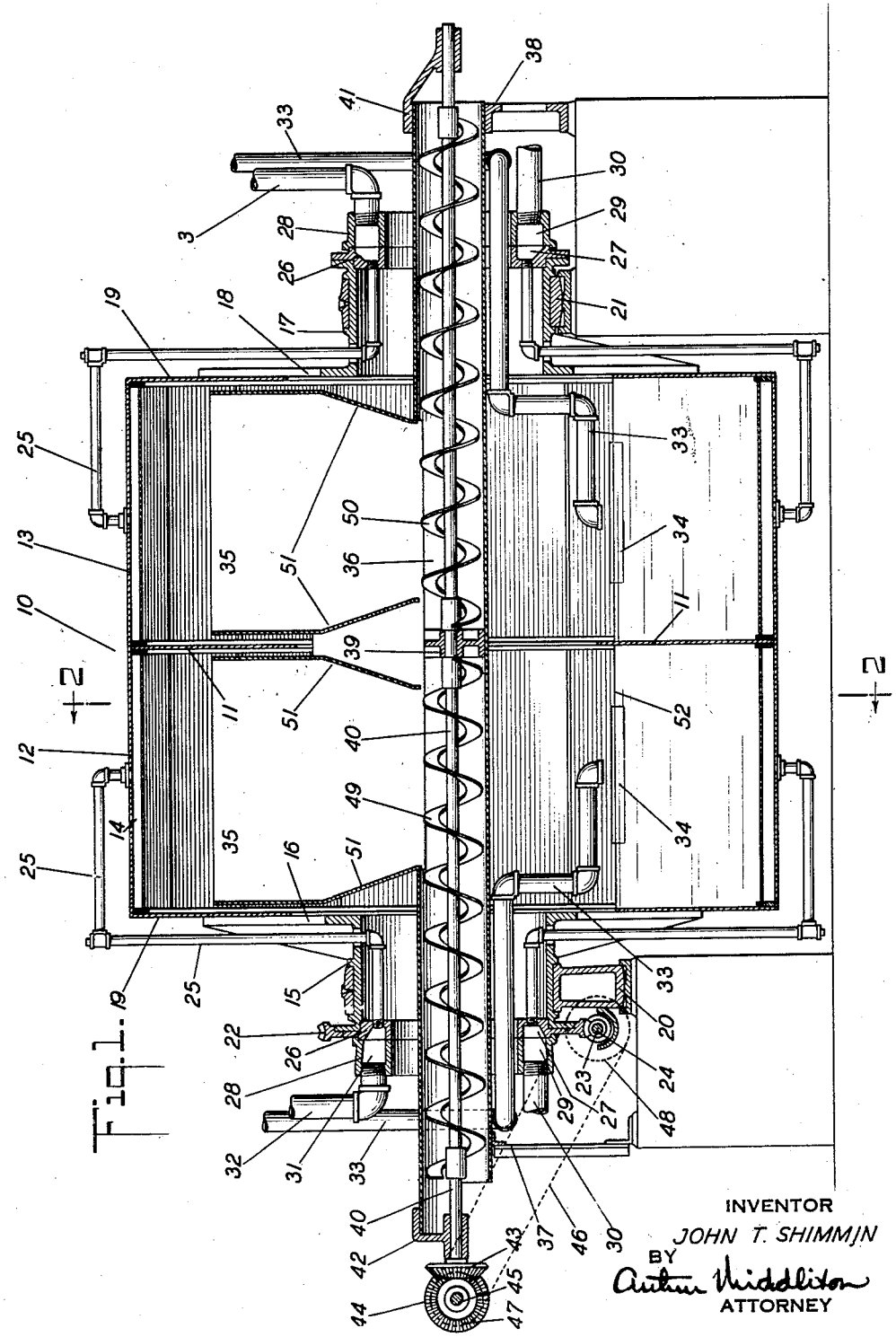
INVENTOR
JOHN T. SHIMMIN
BY
Arthur Middleton
ATTORNEY

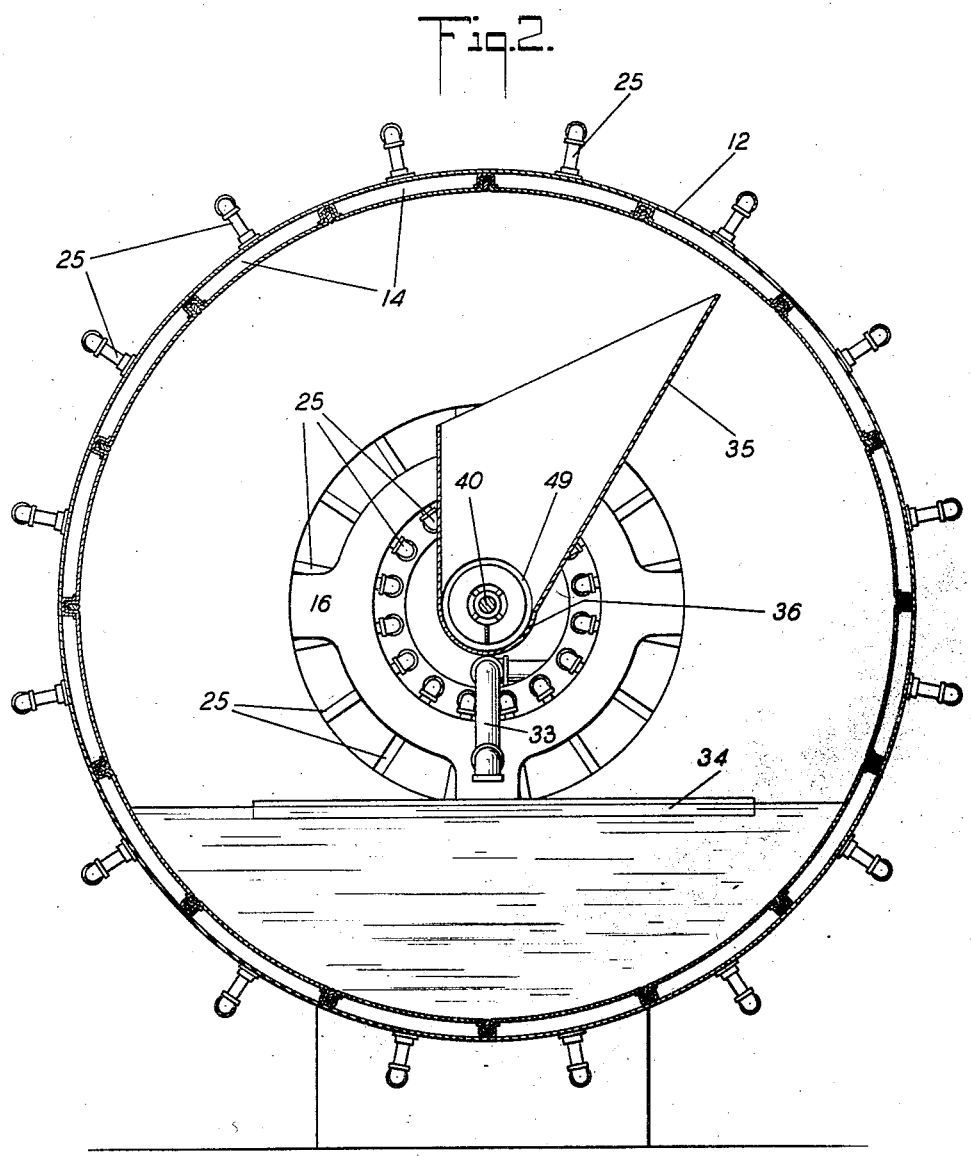

Patented Aug. 9, 1932

1,870,387

UNITED STATES PATENT OFFICE

JOHN T. SHIMMIN, OF TONOPAH, NEVADA, ASSIGNOR TO THE DORR COMPANY, INC., OF NEW YORK, N. Y., A CORPORATION OF DELAWARE

MULTIPLEX FILTER

Application filed December 27, 1930. Serial No. 505,043.

This invention relates to rotary filters and more particularly to those of the multiplex type.

The objects of the invention may be attained in general by arranging end to end a plurality of rotary filter units connected together for rotation about a common axis by a common rotating means and by providing in connection therewith conveying means to receive directly the cake from the different units and remove it longitudinally of the rotary filter structure. In a preferred embodiment of the invention, two filter units are combined in a single drum structure of the interior feed type supported for rotation by means including two hollow trunnions projecting from opposite ends thereof; the pressure variations in the sections of the two units are controlled by pipes leading therefrom and passing outwardly through the trunnions to rotary valves at the outer end of the trunnions; the pulp for the two units is supplied through the adjacent trunnions; and the cake from the two units is conveyed outwardly through the corresponding trunnions.

It is an important feature of this arrangement that two different kinds of pulps can be filtered separately therein, due to separate feed, and separate valve control for each filter element, while a unitary cake discharge means serves both filter elements simultaneously, extending through the trunnions at each end of the machine.

In the preferred embodiment is shown a screw conveyor having oppositely acting blade means on different portions thereof.

I have described herein an embodiment of my invention which is the best of which I am at present advised but it is to be understood that it is used in an illustrative sense for obviously the invention is capable of other embodiments without departing from the spirit and scope thereof. This preferred embodiment is illustrated in the accompanying drawings in which:—

Fig. 1 is a longitudinal sectional view taken along a vertical plane passing through the axis of the revolving filter structure; and Fig. 2 is a vertical sectional view taken on the line 2—2 and looking in the direction of the arrows.

Referring to the drawings, 10 designates a duplex filter drum separated by an annular wall or partition 11 into two smaller drums or units 12 and 13, each of which smaller drums is provided at its periphery and at its interior with a plurality of hollow sections 14 (Fig. 2). The main drum is provided at the outer end of the unit 12 with a hollow trunnion 15 having at its inner end a spider 16 by which it is attached to the annular outer end wall 19 of the unit 12; and at the other end with a hollow trunnion 17 provided with a spider 18 attached to the annular outer end wall 19 of the unit 13. The trunnion 15 is journaled in a suitable support 20, and the trunnion 17 is journaled in a suitable support 21. For the purpose of turning the rotary filter structure, there is secured to the outer end of the trunnion 15 a worm wheel 22 meshing with a worm 23 on a shaft 24 driven from any suitable source of power.

Connected with each of the cells 14 of the unit 12 is a pipe or conduit 25 and all of the conduits extend from the cells inwardly and radially at the outer end of the unit until they pass into the trunnion 15 through suitable openings, and then outwardly through the trunnion to a standard disk valve including rotary valve member 26 having ports 27 one for each conduit, into the inner ends of which ports the end of the conduits are secured as by screw threads. Cooperating with the valve member 26 to form a rotary valve is a stationary valve member or cover 29 having an annular portion covering all of the outer ends of the ports and provided at the lower part thereof with a suction chamber 29 connected with a suction line 30, and at the upper part thereof with a pressure chamber 31 connected with a pressure line or pipe 32.

During the operation of the apparatus, the interior of each cell as it passes beneath the pulp in the lower part of its path is subjected to suction as a result of the connection of the corresponding conduit or pipe 25 with the suction chamber 29; and is subjected to pressure as the cell passes through the upper part of its path, due to the connection of the conduit with the pressure chamber 31. As a result of these variations or reversals of pressure, the pulp, which is supplied to the unit 12 through a conduit or pipe line 33 discharging on a feed distributor 34, is drawn against the filter material of a section and the liquid or filtrate is drawn through the filter material and discharged through the suction line 30.

Solid matter in the pulp is collected against the filter material in the form of a cake during the movement of the section through the lower part of its path and during the passage of the section through the upper part of the path is discharged into a chute 35 from which the cake passes into a trough 36 which also extends under a corresponding chute 35 in the filter unit or drum 13. The unit 13 is supplied with pulp through a pipeline 33 discharging on a distributor plate 34 in the same manner as unit 12, and pressure variations are controlled, in the manner described in connection with unit 12, by means including conduits 25, a rotary valve member 26 having ports 27, and a stationary valve member having a suction chamber 29 connected with a suction line 30, and having a pressure chamber 31 connected with a pressure line 32.

At opposite ends thereof the trough 36 is provided with tubular extensions, one of which passes out through the trunnion 15 and rests upon a support 37 and the other of which passes out through the trunnion 17 and is sustained by a support 38. Substantially in the plane of the partition 11, the trough 36 is divided into two parts by a member 39 which serves as a partition and in which is journaled a shaft 40 passing axially through the tubular extensions of the trough and journaled respectively in a bracket 41 projecting from the support 38 and in a member 42 at the outer side of the support 37 and attached to the corresponding tubular extension. Adjacent to the member 42 and at the outer side thereof, the shaft 40 is provided with a bevel gear 43 fixed thereon and meshing with a bevel gear 44 on a shaft 45 which is connected with the shaft 24 as by means including a belt 46 passing around a pulley 47 on the shaft 45 and around a pulley 48 on the shaft 24.

At the opposite side of the partition 39 the shaft 40 has attached thereto helical conveyer blades 49 and 50 adapted to cooperate with the trough 36 and with the tubular extensions to convey the cake from the filter sections out of the apparatus. Such helical blades have opposite pitches so that upon rotation of the shaft 40 in the proper direction the cake from the units 12 and 13 is conveyed out of the apparatus in opposite directions the direction in which it is moved depending upon which side of the partition 39 it has entered the trough. As shown on Fig. 1, the end walls 51 of the chutes 35, that is, the walls which extend across the trough, converge towards each other as they approach the trough. This assures the separation of the cake above the trough partition 39 so that there is no chance for the cake to fall on the top of the partition and no chance for accumulation of the cake close to the partition. The outer end walls 51 come down inside the tubular extensions of the trough and thus prevent the escape of cake at these points.

The extreme height of pulp in the units 12 and 13 is indicated by the line 52 and is determined by the size of the central openings in the end walls 19. The central opening in the central partition 11 being no larger than those in the end walls so that there is no overflow from one unit to the other.

It should be understood that various changes may be made in the construction and arrangement of parts and that some parts may be used without others, without departing from the true spirit and scope of the invention.

Having thus described my invention, I claim:

1. In filter apparatus, in combination a rotary drum having two filtering compartments, said drum having annular ends, means for supporting said drum including hollow trunnions secured centrally to the ends thereof, and means for simultaneously removing from said filtering compartments cake formed therein during a filtering operation, comprising unitary conveying means extending through said filter compartments and through said trunnions, and adapted to convey cake from said fiter compartments in opposite directions respectively.

2. Filter apparatus according to claim 1, in which there is provided a single means for operating said conveying means.

3. Filter apparatus according to claim 1, in which the conveying means include a screw conveyer having oppositely acting blade means on different portions thereof.

4. Filter apparatus according to claim 1, in which each filter compartment is provided with a separate discharge chute having a constricted lower end whereby to direct the cake from each filter element into opposed conveyer sections respectively.

In testimony whereof I affix my signature.

JOHN T. SHIMMIN.